United States Patent Office 3,151,986
Patented Oct. 6, 1964

3,151,986
FREE-FLOWING FUMARIC AND ADIPIC ACID COMPOSITIONS
John H. Van Ness, Kirkwood, Mo., assignor to Monsanto Company, a corporation of Delaware
No Drawing. Filed May 2, 1962, Ser. No. 191,735
7 Claims. (Cl. 99—78)

This invention relates to acid compositions and particularly to free-flowing fumaric acid and/or adipic acid compositions which are readily soluble in cold water.

Citric acid has been traditionally used as an acidulant for a variety of beverages both alcoholic and non-alcoholic; and has enjoyed widespread usage in the preparation of carbonated beverages, wines, dry beverage concentrates, beer and the like. Since adipic and fumaric acids are more effective than citric acid, are completely edible and non-hygroscopic, these acids have previously been considered as potentially attractive beverage acidulants. However, they have one serious drawback. This shortcoming is their exceedingly low solubility in water. Less than one part of fumaric acid and only about one and a half parts of adipic acid can be dissolved in one hundred parts of water at approximately room temperature. By contrast, citric acid readily dissolves in less than its own weight of water at moderate temperatures.

Previous attempts to improve the solubility behavior of fumaric and adipic acids in cold water have centered about the incorporation of a particular class of liquid surface active agents, water soluble salts and similar material with the acids. The previously employed surfactants do enhance the solubility behavior of the acids under consideration for a short period of time. However, the inherent tackiness of such surfactants causes eventual agglomeration and virtual elimination of the advantages temporarily realized. Thus, these prior efforts have met with some success but the results heretofore achieved have left much to be desired. These known methods have some favorable effect on the cold water solubility of the acids but have not eliminated the problem. Then too the presently known fumaric and adipic acid preparations have a relatively short shelf life and tend to cake when stored for a period of a month or more, even in water impervious packages. This renders them commercially unacceptable, since the caked formulations do not readily dissolve.

Therefore, it is an object of the present invention to provide fumaric acid and adipic acid in new and novel forms overcoming the disadvantages of the prior art. More specifically it is an object of this invention to provide free-flowing fumaric acid and adipic acid compositions that are readily soluble in cold water.

These and other objects are accomplished in accordance with the present invention generally speaking by mixing fumaric acid, adipic acid or mixtures thereof with the dialkyl esters of sodium sulfosuccinate. More specifically this invention contemplates the provision of a substantially uniform mixture of fumaric and/or adipic acid with the dialkyl esters of sodium sulfosuccinate containing between 7 and 11 carbon atoms in each of their alkyl chains. Di-(2-ethylhexyl)-sodium sulfosuccinate is the preferred member of this group but the remaining dialkyl esters indicated above are also satisfactory. Representative esters of this type include Di-(n-heptyl)-sodium sulfosuccinate,
Di-(n-octyl)-sodium sulfosuccinate,
Di-(1-methyl-4-ethyloctyl)-sec sodium sulfosuccinate,
Di-(1-methylhexyl)-sec sodium sulfosuccinate,
Di-(n-octyl)-sodium sulfosuccinate,
Di-(n-heptyl)-sodium sulfosuccinate,
Di-(1-butylamyl)-sec sodium sulfosuccinate,
Di-(isobutyl-3-methylbutyl)-sec sodium sulfosuccinate,
Mono - 2 - ethylhexyl, mono - 1 - methyl - 4 - ethylhexyl sodium sulfosuccinate,
Mono - 2 - ethylhexyl, mono - 1 - methylheptyl sodium sulfosuccinate, and
Di-(1-methyl-4-ethylhexyl)-sec sodium sulfosuccinate.

It is believed that these esters form a substantially uniform coating over each of the solid acid particles. Since, however, it is exceedingly difficult to verify the presence of a coating on all of the particles treated the invention is not limited to this concept. It has been found that it is only necessary to provide an intimate mixture in which the surface active agent is substantially uniformly distributed throughout the bulk of the acid particles. The treated acids of the present invention can be prepared in a number of ways. For example, commercially available fumaric and adipic acids can be reduced to a powder in the presence of the surfactant or a dispersion or solution thereof. Alternately, the acid in powder form can be mixed or tumbled with the ester until the requisite intimacy of contact has been attained. Such a process is satisfactory when using a sodium sulfosuccinate in solid form, such as the di-(2-ethylhexyl) ester at ambient temperatures. When a liquified surfactant is added directly to the powdered acids, it is preferable to use relatively dilute solutions to minimize any tendency of the wetting agent toward local concentration on the acid particles. While this modification does result in the formation of a satisfactory product it is necessary to remove the solvent therefrom after the solution has been uniformly distributed. Thus, in order to avoid such difficulties it is normally preferred to mix liquified surfactants with the acid prior to milling. This is most conveniently accomplished by liquifying the sodium sulfosuccinates prior to their application by use of a solvent or heat or both. These esters are readily fluidized by dissolving them in water, acetone, ethyl alcohol or other relatively volatile solvents. Alternately the esters can be easily fluidized by heating above their melting points, thus eliminating the need of a solvent or other diluent. With the di-(2-ethylhexyl) ester a temperature between about 60° C. and about 80° C. will suffice.

Commercially available fumaric acid and adipic acid are random sized crystalline materials having particles within the approximate size range of 25 to 250 microns. In order to enhance their solubility characteristics, these materials must be reduced to a maximum particle size of about 75 microns and preferably to an average particle size within the range of 20 to 75 microns. However, particles significantly smaller than 20 microns are not desirable because they are readily air borne, exceedingly difficult to handle, and exhibit increased agglomeration tendencies. The particle size reduction can be effected by conventional means. Thus the acids can be ground in most of the commercially available mills.

The proportions of dialkyl sodium sulfosuccinate used are preferably between about 0.1% and about 1% by weight of the acid. Generally compositions containing less than about 0.1% of the esters do not exhibit the requisite solubility whereas more than 1% of the agent serves no useful purpose. The esters used in accordance with the present invention are endowed with a unique combination of advantageous characteristics. They are generally solid, capable of wetting the surface of the acid particles and are miscible with water. They are also non-toxic, readily compatible with the acid and have little or no tack. In addition they exhibit at most a minimum of foaming properties when mixed with water. Moreover, they are readily transformed to sprayable liquids which facilitates their addition to the acids.

Example 1

About 100 parts of dry crystalline fumaric acid having a particle size such that substantially all of the material passes through a 60 mesh screen and is retained on a 325 mesh screen is introduced into a ribbon blender and sprayed with approximately 1.7 parts of a 30% solution of di-(2-ethylhexyl)-sodium sulfosuccinate (Aerosol OT) in acetone. When the solution is thoroughly blended with the fumaric acid, the acetone is evaporated from the resultant mixture by gently heating for approximately 30 minutes. The dried material is then removed from the blender, and milled in an air classifying pulverizing mill. When the dry fumaric acid is ground sufficiently fine to pass through a 325 mesh screen it becomes air borne and is removed from the mill in a current of air. The mill exhausts into a centrifugal separator from which the finely divided fumaric acid proivded with a coating of approximately 0.5% di-(2-ethylhexyl)-sodium sulfosuccinate is collected. The product thus obtained is a dry free-flowing fumaric acid composition having a particle size between about 325 and 400 mesh.

Example 2

The process of Example 1 is substantially repeated. However, in this embodiment the di-(2-ethylhexyl)-sodium sulfosuccinate is rendered sufficiently fluid to be sprayed by heating it to about 75° C. This eliminates the use of a solvent and the need for its subsequent removal. The product thus obtained is substantially equivalent to the product of Example 1.

Example 3

About 100 parts of dry crystalline fumaric acid and about 0.5 part of di-(2-ethylhexyl)-sodium sulfosuccinate are introduced into a ribbon blender at ambient temperature. The fumaric acid is in the form of crystals ranging in size from about 60 to about 325 mesh, while the di-(2-ethylhexyl)-sodium sulfosuccinate is an amorphous solid with an average particle size of about 100 mesh. These materials are thoroughly blended and then transferred to an air classifying centrifugal mill. After being reduced to an average particle size of about 325 mesh, the acid mixture is passed to a centrifugal separator and collected. The material thus obtained is substantially identical to that obtained in accordance with the previous examples.

The procedure followed in the above examples is substantially repeated using adipic acid in place of fumaric acid. These methods result in the production of free-flowing acid compositions containing a minor proportion of a surface active agent.

In order to exhibit the advantages of the present invention, samples of the preparations from each of the above examples were stored at a temperature of about 50° C. for approximately three weeks. This treatment represents an accelerated storage test using a temperature range well above that normally encountered in general usage. Samples of fumaric and adipic acid coated with approximately 0.5% Tween 60 and also uncoated samples of these acids having a particle size between about 20 and 75 microns were also prepared and subjected to the same storage test as a control.

At the end of the three week period the samples were removed from storage and cooled to room temperature. The preparations prepared in accordance with the present invention were free-flowing and substantially free of agglomerates. By contrast, the control samples exhibited agglomeration as a result of the storage test. The solubility characteristics of both types of material were determined by adding 0.15 gram of each material being tested in about 100 ml. of cold water (approximately 5° C.). When the samples treated with the dialkyl sodium sulfosuccinate were added to the cold water, they were immediately wetted by the water and dissolved in less than one minutes with moderate spoon stirring. On the other hand, the control samples were not uniformly wetted by the water. While some portions of the control samples did disslove, portions of the samples remained on the surface of the water whereas the relatively large agglomerates present tended to settle to the bottom. These clusters or agglomerates of the control fumaric acid compositions remained undissolved even after two or three minutes of rather intensive spoon stirring. These comparative tests readily illustrate the advantages obtained by the utilization of a dialkyl sodium sulfosuccinate.

The term "readily soluble in cold water" is used herein to identify fumaric or adipic acid compositions that substantially completely dissolve in about 100 parts by weight of water at a temperature in the neighborhood of 5° C. within one minute with only a minimum of agitation. The intensity of agitation required need only be sufficient to expose the acid particles to successive portions of water and to eliminate the formation of a quiescent envelope of a saturated acid solution about each of the particles.

Numerous modifications will readily suggest themselves to those skilled in the art. Thus, while the invention has been described with particular reference to specific embodiments, it is to be understood that it is not to be limited thereto but is to be construed broadly and restricted solely by the scope of the appended claims.

The embodiments of the invention in which an exclusive property or privilege is claimed are defined as follows:

1. A free-flowing acid composition readily soluble in cold water which comprises powdered fumaric acid having a maximum particle size of about 75 microns and coated with between about 0.1% and about 1% of di-(2-ethylhexyl)-sodium sulfosuccinate.

2. A free-flowing acid composition readily soluble in cold water which comprises powdered adipic acid having a maximum particle size of about 75 microns and coated with between about 0.1% and about 1% of di-(2-ethylhexyl)-sodium sulfosuccinate.

3. A method for the preparation of a free-flowing acid composition readily soluble in cold water which comprises spraying a powdered crystalline acid selected from the group consisting of fumaric acid and adipic acid with between about 0.1% and about 1% of a dialkyl sodium sulfosuccinate having between about 7 and about 11 carbon atoms in each of the alkyl chains, and subsequently milling the mixture, the acid after milling having a maximum particle size of about 75 microns.

4. A method for the preparation of a free-flowing acid composition readily soluble in cold water which comprises mixing powdered fumaric acid having a maximum particle size of about 75 microns with between about 0.1% and about 1% of di-(2-ethylhexyl)-sodium sulfosuccinate.

5. A method for the preparation of a free-flowing acid composition readily soluble in cold water which comprises mixing powdered adipic acid having a maximum particle size of about 75 microns with between about 0.1% and about 1% of di-(2-ethylhexyl)-sodium sulfosuccinate.

6. A free-flowing acid composition readily soluble in cold water which comprises a powdered acid having a maximum particle size of about 75 microns and selected from the group consisting of fumaric acid and adipic acid coated with between about 0.1 and about 1% of a dialkyl sodium sulfosuccinate having between 7 and 11 carbon atoms in each of the alkyl chains.

7. A method for the preparation of a free-flowing acid composition readily soluble in cold water which comprises mixing a powdered acid having a maximum particle size of about 75 microns and selected from the group consisting of fumaric acid and adipic acid with between about 0.1 and about 1% of a dialkyl sodium sulfosuccinate having between 7 and 11 carbon atoms in each of the alkyl chains.

References Cited in the file of this patent

UNITED STATES PATENTS

| | | |
|---|---|---|
| 2,332,735 | Lyons | Oct. 26, 1943 |
| 3,009,810 | Raffensperger et al. | Nov. 21, 1961 |
| 3,009,811 | Raffensperger et al. | Nov. 21, 1961 |